(12) United States Patent
Müller

(10) Patent No.: US 6,520,444 B1
(45) Date of Patent: Feb. 18, 2003

(54) TOOLBOX CONTAINING A LEAST ONE CABLE REEL

(76) Inventor: Lothar Müller, Anton-Köck-Strasse 20, D-82049 Pullach (DE)

( * ) Notice: Subject to any disclaimer, the term of this patent is extended or adjusted under 35 U.S.C. 154(b) by 0 days.

(21) Appl. No.: 09/485,676

(22) PCT Filed: Aug. 7, 1998

(86) PCT No.: PCT/EP98/05031
§ 371 (c)(1),
(2), (4) Date: Feb. 24, 2000

(87) PCT Pub. No.: WO99/10134
PCT Pub. Date: Mar. 4, 1999

(30) Foreign Application Priority Data

Aug. 27, 1997 (DE) .......................... 197 37 424

(51) Int. Cl.[7] .................. B65H 75/48; B65H 75/38; H01R 13/72
(52) U.S. Cl. ....................... 242/378.4; 242/388.1; 242/388.5; 242/388.6; 242/400; 439/501
(58) Field of Search .................. 242/588.6, 588.1, 242/378.1, 378.4, 400, 378.2, 388.6, 388.7, 388.5, 395, 395.1; 439/501

(56) References Cited

U.S. PATENT DOCUMENTS

| | | | | | |
|---|---|---|---|---|---|
| 3,733,478 | A | * | 5/1973 | Barker | 362/387 |
| 3,809,331 | A | * | 5/1974 | Gaul | 242/388.1 |
| 3,853,285 | A | * | 12/1974 | Woodring | 242/378.1 |
| 4,322,045 | A | * | 3/1982 | Tellier | 242/388.1 |
| 5,103,977 | A | * | 4/1992 | Douglas | 206/334 |
| 5,339,956 | A | * | 8/1994 | Thomason | 206/372 |
| 5,344,339 | A | * | 9/1994 | Cheslock | 439/501 |
| 5,848,701 | A | * | 12/1998 | Riccabona | 439/501 X |
| 5,913,487 | A | * | 6/1999 | Leatherman | 242/378.4 |

FOREIGN PATENT DOCUMENTS

| | | | |
|---|---|---|---|
| DE | 82 27 725 U | * | 1/1983 |
| GB | 2 226 009 A | * | 6/1990 |

* cited by examiner

*Primary Examiner*—Michael R. Mansen
(74) *Attorney, Agent, or Firm*—Greenblum & Bernstein, P.L.C.

(57) ABSTRACT

Toolbox having closable cover with first cable reel and second cable reel being rotatably mounted in an interior of the toolbox, and first electrical cable, including a first connection end with an electrical plug, wound on said first reel and second electrical cable, including a second connection end with an electrical coupling, wound on said second reel. The first electrical cable and the second electrical cable are electrically coupled to each other. First cable wind-up arrangement is associated with the first cable reel, and second cable wind-up arrangement is associated with said second cable reel. Further, first cable pass-through opening is in a wall of said toolbox, such that the first connection end is adapted to pass through the first cable pass-through opening from the interior of the toolbox to an exterior of the toolbox, second cable pass-through opening in one of a same and a different wall of the toolbox, such that the second connection end is adapted to pass through the second cable pass-through opening from the interior of the toolbox to the exterior of the toolbox.

23 Claims, 8 Drawing Sheets

TOOLBOX CONTAINING A LEAST ONE CABLE REEL

CROSS-REFERENCE TO RELATED APPLICATIONS

The present application is a U.S. National Stage of International Application No. PCT/EP 98/05031 filed Aug. 7, 1998 and claims priority under 35 U.S.C. §119 of German Patent Application No. 197 37 424.7 filed Aug. 27, 1997.

BACKGROUND OF THE INVENTION

1. Field of the Invention

The invention concerns a toolbox which may be used both by hobbyists and industrial handworkers.

2. Discussion of Background Information

In the private and the industrial sector, it has long been known to operate special tools and devices electrically. These include, for example, drills, grinders, saws, and machines for tightening and removing screws or nuts, as well as other devices, such as lights, heaters, and pumps (e.g., also for preparation of a working substance, such as compressed air for pneumatically driven tools or a pressurized hydraulic oil for hydraulically activated tools). The expression "tool" used hereinafter also includes the aforementioned devices. Usually, connection to an electric network is necessary as a source of current for such tools. This applies in any case for high-performance tools, for whose operation using a battery is inadequate. Frequently, operation of such tools is only temporarily necessary such that a permanently installed electrical line is not reasonable for this.

Since the appropriate connection point to the electrical network is often not located in the immediate vicinity of the site where the tool is to be operated, the length of the connection cable provided on the tool is frequently inadequate. Consequently, this cable must be supplemented by an extension cable. Thus, it is in many cases necessary for the tool to always have the extension cable available. This must then always be transported with the tool and must not get lost.

It is also known to store and transport tools of the type mentioned in toolboxes specifically provided therefor. There is not usually adequate space for extension cables in such toolboxes.

DE 8227725 U1 describes a foldout toolbox for accommodating a hand drill and its accessories. The toolbox also includes an immovably attached and removable cable reel for the electrical connection of the drill. The cable end of the cable reel that is provided with an electrical plug is passed through one side wall of the toolbox. The other cable end can be pulled out of the toolbox when its cover is open.

This prior art does, in fact, make it superfluous to provide a separate extension cable for the drill and to transport it separately each time to the site where the drill is to be used. However, the use of the cable reel is only possible when the cover of the box is open. This is, however, disadvantageous with a toolbox which contains, on the one hand, other valuable devices besides the drill (or another electrically driven tool), such as a drill dust vacuum, drill cassettes, drills for various materials, as well as cutting, grinding, and polishing attachments, and, on the other hand, must frequently be used by professional handworkers at outdoor construction sites and assembly sites. Since a wide variety of individuals have access to such sites, experience has shown that it is not possible to prevent a tool which is accessible for hours everyday, for example, in an open toolbox, from being stolen repeatedly.

In addition, naturally, considerable amounts of dust and other contaminants, which are obviously undesirable, can penetrate into such a toolbox whose lid is open, in particular at a construction site. The risk also exists at a construction site where water is frequently present that moisture or water can get into the open toolbox. In the case of a toolbox containing electrical devices, this even results in a significant danger to individuals working therewith.

SUMMARY OF THE INVENTION

Consequently, the present invention provides a toolbox which can also be designed in the form of a tool chest which includes an extension cable in the form of a cable reel for an electrical tool stored therein or another electrical tool, which can also be used with the cover closed or even locked and simultaneously prevents both unwanted looking into the toolbox or even unauthorized access to the contents of the box and, also penetration of dust, dirt, moisture, and water into the toolbox.

The invention is directed to a toolbox with an electrical cable arranged in the interior of the toolbox, which is wound on at least one cable reel rotatably attached in the toolbox, and a cable wind-up arrangement. A first cable pass-through opening is provided in one wall of the toolbox, through which a first connection end of the electrical cable with an electric plug is passed through from the interior of the toolbox to the outside. Moreover, a second cable pass-through opening is provided in the wall of the toolbox, through which a second connection end of the electrical cable with an electrical coupling is passed through from the interior of the toolbox to the outside.

The electrical cable used according to the invention includes a first cable section with a first connection end on which the electrical plug is arranged, and of a second cable section with a second connection end, on which the electrical coupling is provided. The two cable sections may be quite different in length.

The toolbox according to the invention is also equipped with a cable wind-up arrangement. This can, for example, be a handle or an appropriate recess on the periphery of the cable reel, with the aid of which the cable reel can be manually rotated. Alternatively, the cable reel may also include a spring mechanism, by which the unwinding of the cable by pulling against this spring force occurs with the action of a known latch when the desired cable length is reached and the winding up of the cable occurs by spring force alone.

According to a special embodiment, the cable wind-up arrangement is designed with a single wind-up mechanism for simultaneous unwinding and winding of the cable section with the electrical plug and of the cable section with the electrical coupling.

According to a further embodiment, a first cable reel with an associated first cable wind-up device is designed for the cable section with the electrical plug and a second cable reel with an associated second cable wind-up device is designed for the cable section with the electrical coupling. In this case, the two cable reels can be arranged in one half of the toolbox (either in the part referred to as the mounting portion in the following description of the drawing or in the part referred to as the cover portion therein), or the first cable reel in the mounting portion and a second cable reel in the cover portion of the toolbox or vice versa. In each case, the electrical cable on the first cable reel is electrically connected to the electrical cable on the second cable reel.

Preferably, the cable reel is or the cable reels are releasably attached in the toolbox (for example, by a wing nut or a wing bolt or a snap lock between the cable reel and its axis of rotation), possibly along with the respectively associated cable wind-up arrangement. The first and the second cable pass-through openings are designed in each case in the form of a slot extending to the outside edge of the respective side wall of the tool chest, through which the electrical cable can be drawn out and can be pushed back in again perpendicular to its longitudinal direction. Thus, the toolbox offers the capability, as needed, of removing the cable reel or the cable reels with the entire electrical cable as well as the electrical plug and the electrical connection from the toolbox and to replace it there after use. Thus, the electrical cable is even more versatile. When the cable reel or the cable reels are attached in the toolbox, the electrical cable is always available as mentioned above wherever the toolbox with the tool stored therein is located. If the cable reel or the cable reels have been removed from the toolbox, that cable reel may be used as a conventional cable reel. Such use can be very expedient in the individual instance, for example, when, because of very restricted space, the electrical cable is to be used without the toolbox.

It has also proved advantageous for that portion of the interior of the toolbox in which at least one cable reel is arranged to be separated from the rest of the interior of the toolbox by a removable false bottom. The false bottom can also assume the function of a separate housing for the cable reel, such that this housing as such may be omitted. The false bottom may, however, also be used in addition to such a separate housing and, for example, serve as a carrier for certain small hand tools or small parts. Moreover, the false bottom may also extend over only a portion of the base area of the interior of the toolbox.

In order to prevent the ends of the wound up electrical cable with the electrical plug and the electrical coupling from hanging down loose on the outside of the box or the plug and the coupling from projecting beyond the periphery of the box in a disadvantageous fashion, an attachment device for the cable connection ends are preferably provided on the outside of the toolbox. Indentations or recesses into which the plug and coupling can be inserted flush with the periphery of the toolbox and where they may be affixed by a clamping holder may additionally be designed in the toolbox wall.

The electrical coupling of the toolbox according to the invention may also be designed in the form of a multiple coupling for simultaneous connection of a plurality of tools to be operated electrically.

The present invention is directed to a toolbox that includes at least one cable reel rotatably mounted in an interior of the toolbox, and an electrical cable wound on the at least one cable reel. The electrical cable includes a first connection end with an electrical plug and a second connection end with an electrical coupling. A cable wind-up arrangement is also included. A first cable pass-through opening is provided in a wall of the toolbox. The first connection end is adapted to pass through the first cable pass-through opening from the interior of the toolbox to an exterior of the toolbox. A second cable pass-through opening is provided in one of a same and a different wall of the toolbox. The second connection end is adapted to pass through the second cable pass-through opening from the interior of the toolbox to the exterior of the toolbox.

According to a feature of the present invention, the cable wind-up arrangement can include a device for simultaneously unwinding the first and second connection ends and for simultaneously winding the first and second connection ends.

In accordance with another feature of the instant invention, the at least one cable reel can be releasably coupled to the toolbox. The first and the second cable pass-through openings may be formed as slots extending to an edge of the wall of the toolbox in which the first and second cable pass-through openings are located, and wherein the at least one cable reel is arranged to be removed in a direction substantially perpendicular to a direction in which the first and second connection ends pass through the first and second cable pass-through openings.

According to still another feature of the invention, a portion of the interior of the toolbox can include a removable false bottom and the at least one cable reel may be rotatably mounted to the removable false bottom. The portion of the interior including the removable false bottom can be isolated from a remaining portion of the interior of the toolbox.

The toolbox can also include at least one attachment device positioned to hold at least one of the first and second connection ends. The at least one attachment device may be located on an outside portion of the toolbox.

The present invention is also directed to a toolbox that includes at least one cable reel rotatably mounted in a toolbox interior and an electrical cable wound on the at least one cable reel. The electrical cable includes a first connection end with an electrical plug and a second connection end with an electrical coupling. A first cable pass-through opening is provided in a wall of the toolbox. The first connection end can be adapted to pass through the first cable pass-through opening from the toolbox interior to a toolbox exterior. A second cable pass-through opening is provided in one of a same and a different wall of the toolbox. The second connection end can be adapted to pass through the second cable pass-through opening from the toolbox interior to the toolbox exterior.

Moreover, a cable winding device can be adapted to wind the electrical cable onto the at least one cable reel. The cable winding device can be adapted to simultaneously wind the first and second connection ends. Alternatively, the cable winding device may be adapted to wind only the second connection end. Further, the cable winding device can be adapted to enable simultaneous unwinding of the first and second connection ends.

According to a feature of the instant invention, the at least one reel can be removably coupled to the toolbox interior.

In accordance with still another feature of the invention, the toolbox interior may include a first section and a second section, which are isolated from each other, and the at least one cable reel can be rotatably coupled in one of the first and second sections. The first and second sections may be releasably coupled to each other.

According to yet another feature of the present invention, at least one attachment device can be coupled to an exterior portion of the toolbox. The at least one attachment device may be adapted to releasably hold at least one of the first and second connection ends.

BRIEF DESCRIPTION OF THE DRAWINGS

The invention is explained in the following with reference to the following Figures.

DETAILED DESCRIPTION OF THE PRESENT INVENTION

Figure 1:
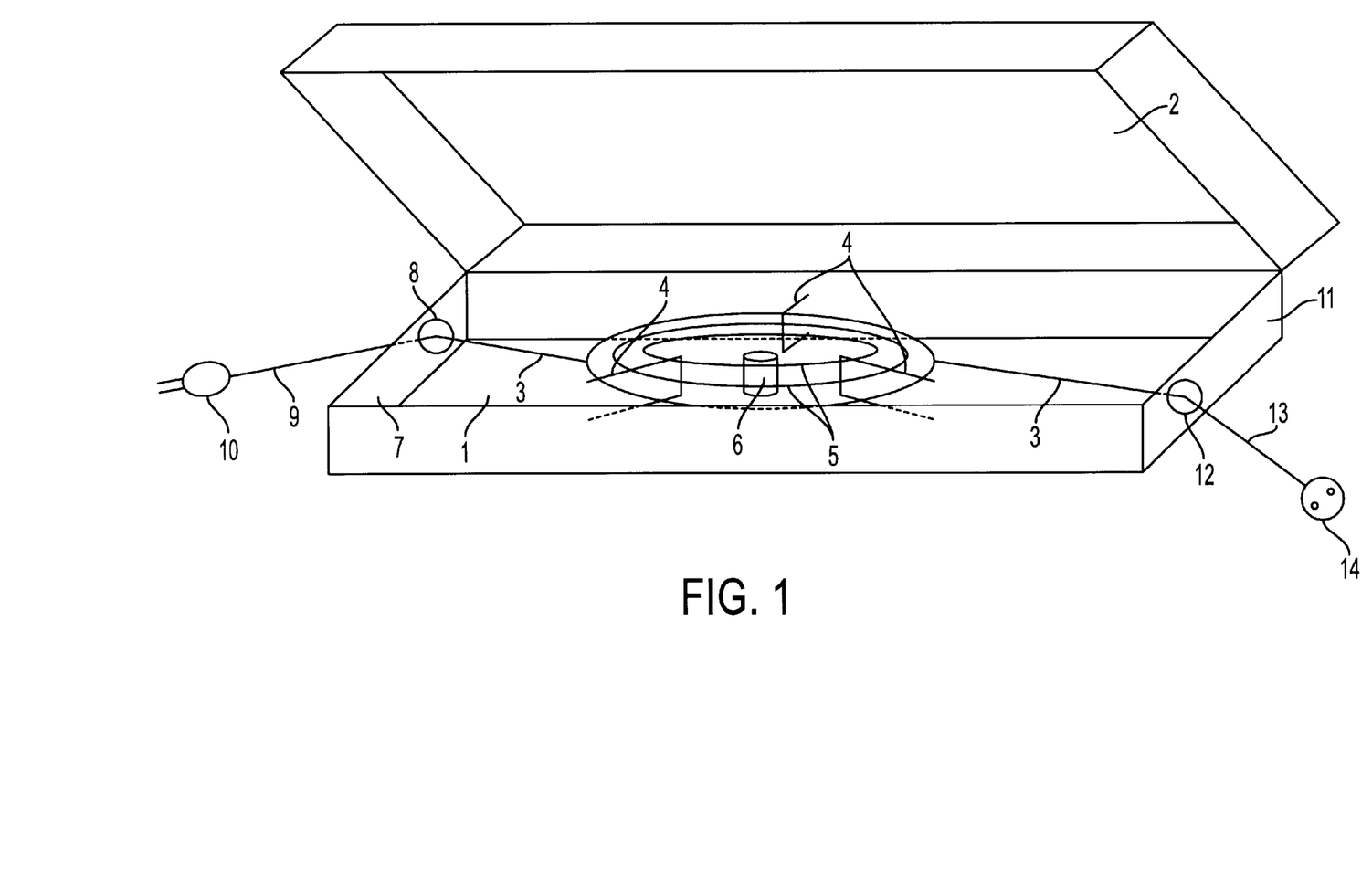
FIG. 1 schematically illustrates an exemplary embodiment of the instant invention having one cable reel.

In the figure, a toolbox according to the invention is depicted in perspective in an open position. For the sake of clarity, only the most important parts of the object of the invention, i.e., the actual toolbox, the electrical cable 3 on a cable reel 4 arranged therein, and the two cable connection ends guided out of the toolbox are shown in a simplified depiction.

According to the figure, the toolbox has an mounting portion 1 and a cover portion 2. The mounting portion 1 is provided to accommodate the electrical cable 3 and other articles (not shown), such as a tool to be operated electrically as well as, possibly, additional small hand tools and any kinds of small parts. The electrical cable 3, whose coils 5 are depicted only schematically by ellipses, is wound up on a cable reel 4 in the mounting portion 1. The cable reel 4 is attached in the mounting portion 1 rotatably and releasably therefrom. The attachment of the cable reel 4 may be achieved, for example, by screwing (not depicted in the drawing) to the mounting portion 1, using a manually releasable wing nut or wing bolt. Alternatively, a conventional snap lock between the cable reel 4 and its rotational axis attached to the mounting part 1 is possible.

Moreover, the cable reel 4 is equipped with a cable wind-up arrangement 6. This includes, for example, a spiral spring (not shown) through whose action the electrical cable 3 is always pulled in the wind-up direction of the cable reel 4. When the electrical cable 3 has been unwound to the desired length, a known locking mechanism prevents automatic rewinding of the electrical cable 3.

A first cable pass-through opening 8, through which a first connecting end 9 of the electrical cable 3 with an electrical plug 10 is guided through to the outside of the toolbox, is provided in a first side wall 7 of the mounting portion 1 of the toolbox.

There is a second cable pass-through opening 12 on a second side wall 11 of the mounting portion 1, which is positioned opposite the first side wall 7, through which a second connection end 13 of the electrical cable 3 with an electrical coupling 14 is guided through to the outside of the toolbox. Alternatively, the two cable pass-through openings 8, 12 may also be located in adjacent side walls or in one and the same wall of the toolbox.

In the embodiment depicted in the drawing, the cable wind-up arrangement 6 is designed only for the unwinding and winding of the cable section with the electrical coupling 14.

Figure 2A:
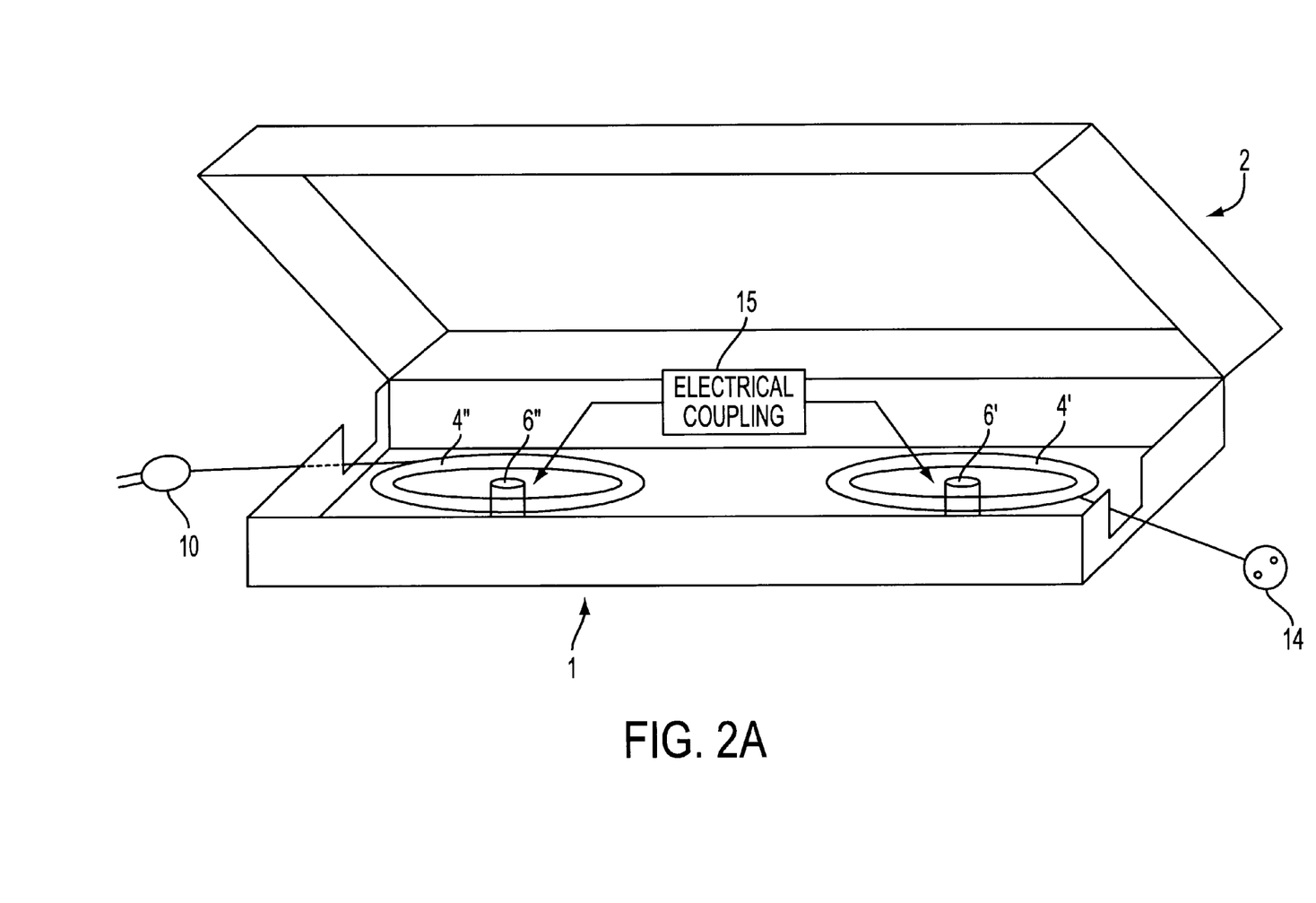
FIG. 2A schematically illustrates a second exemplary embodiment of the instant invention having two cable reels.
Figure 2B:
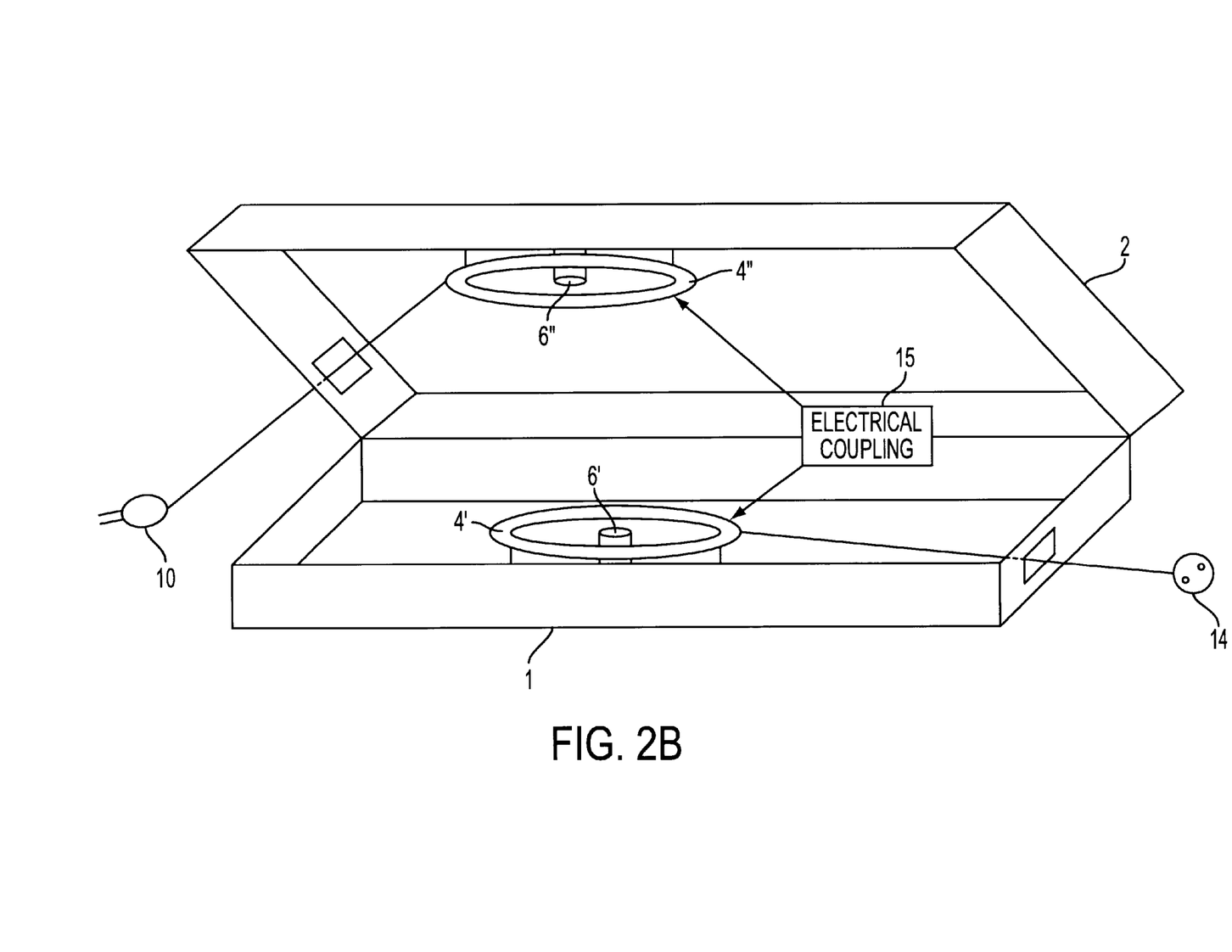
FIG. 2B schematically illustrates a third exemplary embodiment of the instant invention having two cable reels.

An additional embodiment is depicted in FIGS. 2A and 2B, in which more than one cable reel is utilized in the toolbox of the instant invention. In particular, a first cable reel 4" with an associated first cable wind-up device 6" is designed for the cable section with electrical plug 10 and a second cable reel 4' with an associated second cable wind-up device 6' is designed for the cable section with electrical coupling 14. As depicted in the Figures, two cable reels 4' and 4" can be arranged in one half of the toolbox (either in mounting portion 1, as depicted in FIG. 2A, or in cover portion 2), or first cable reel 4' can be arranged mounting portion 1 and a second cable reel 4" can be arranged in cover portion 2 of the toolbox, as depicted in FIG. 2B, or vice versa. In each case, the electrical cable on the first cable reel is electrically connected to the electrical cable on the second cable reel, as schematically illustrated by electrical coupling 15.

For the use of the toolbox according to the invention, which contains a tool to be operated electrically, it is brought to the site of use of the tool after being transported, separate transport of an extension cable being superfluous. At the site, the tool is removed from the toolbox. The electrical plug 10 on the first connection end 9 of the electrical cable 3 is connected to the connection point of the existing electrical network. The second connection end 13 with the electrical coupling 14 is pulled out to the desired cable length through the second cable pass-through opening 12 of the mounting portion 1. Then, the connection cable of the tool to be operated electrically is connected to the electrical coupling 14, whereupon the tool is ready for operation. After ending work with the tool, the connection ends 9, 13 of the electrical cable 3 are separated from the electrical network and from the tool. The cable section with the electrical coupling 14 pulled out is rewound onto the cable reel 4. This occurs in accordance with the type of cable wind-up arrangement 6 either by appropriate rotation of the cable reel 4 manually or using the restoring force of an appropriate spring.

Figure 3A:
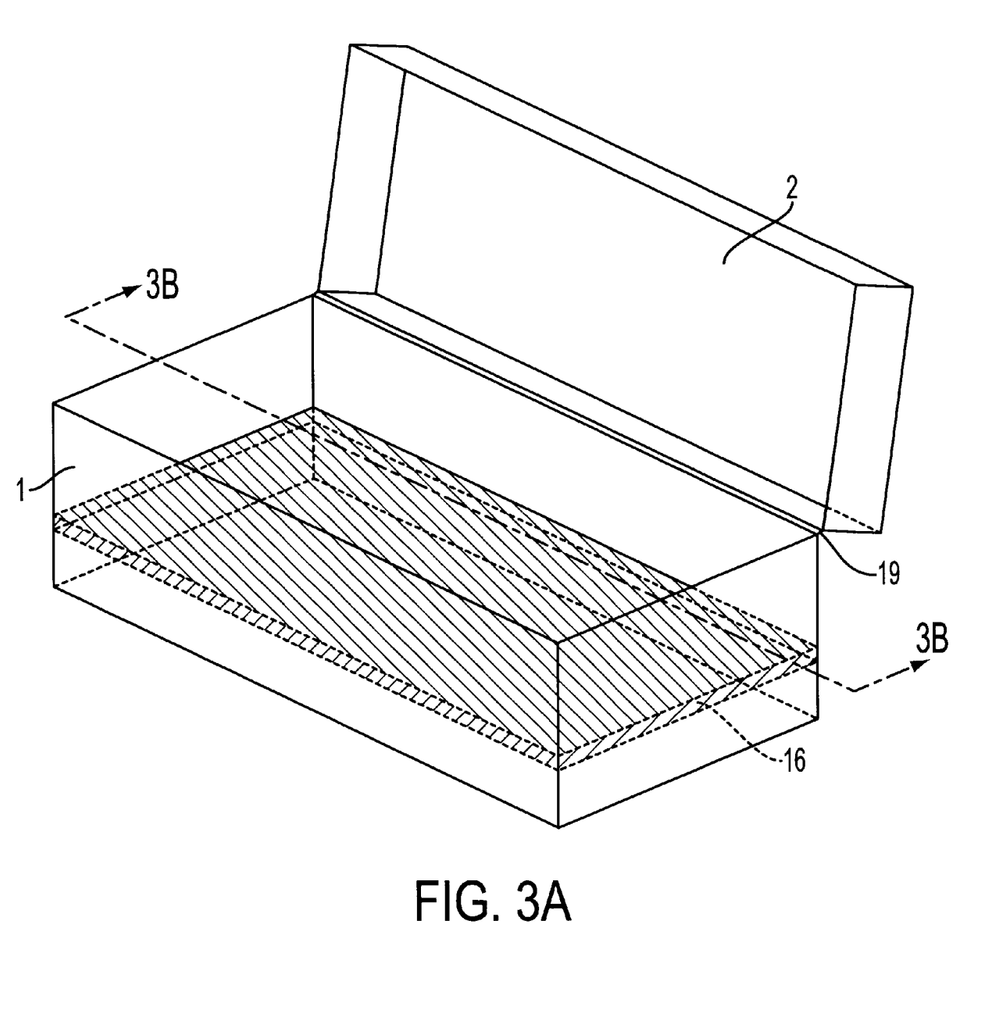
FIG. 3A depicts a fourth embodiment of the present invention which features a removable false bottom.

FIG. 3A depicts an embodiment of the toolbox which features a removable false bottom 16. By the addition of the false bottom 16, the toolbox can be partitioned into two compartments. This allows the cable reels 4, electrical cable 5, and wind-up device 6 to be partitioned off into a separate compartment. A second compartment may then be utilized to store tools or parts. In this embodiment, the mounting portion 1 is attached to cover portion 2 by hinged connection 19

Figure 3B:
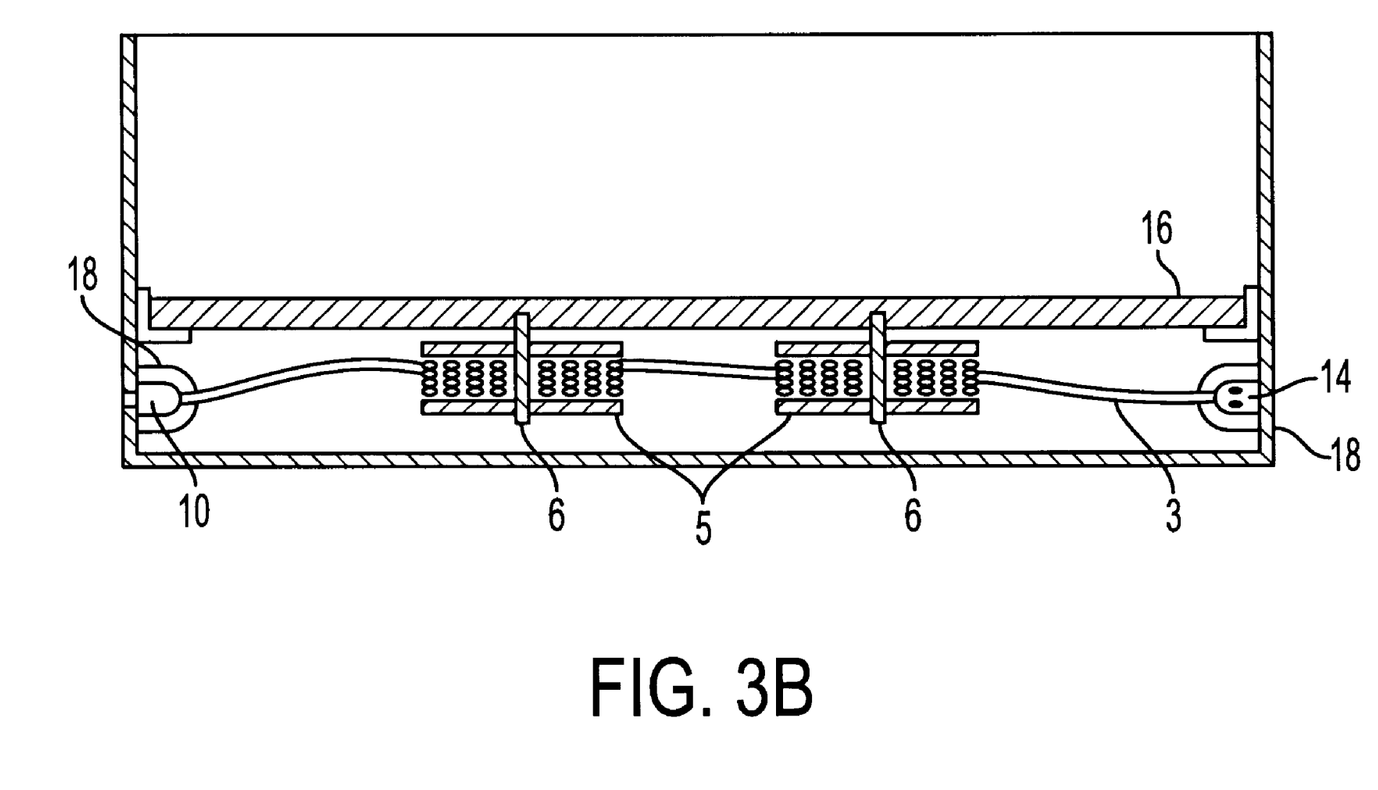
FIG. 3B is a cross-section of the embodiment shown in FIG. 3A taken along 3B—3B, which illustrates two cable reels attached to the false bottom.

FIG. 3B is a cross-section of the embodiment shown in FIG. 3A taken along 3B—3B, which illustrates two cable reels 4 attached to the false bottom 16. With this embodiment, the cable reels 4, electrical cable 5, and wind-up devices 6, are not only partitioned off into a separate compartment, but they are attached to the false bottom 16 for easy installation and removal. Also, indentations or recesses 18 are shown in which plug 10 and coupling 14 can be inserted flush wit the periphery of the toolbox.

Figure 4A:
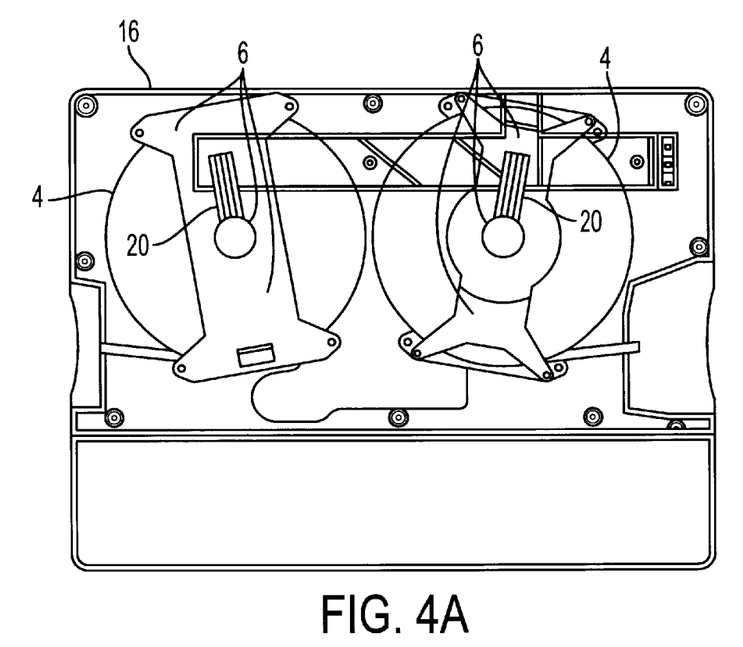
FIG. 4A is a bottom view perspective of another embodiment of the false bottom.
Figure 4B:
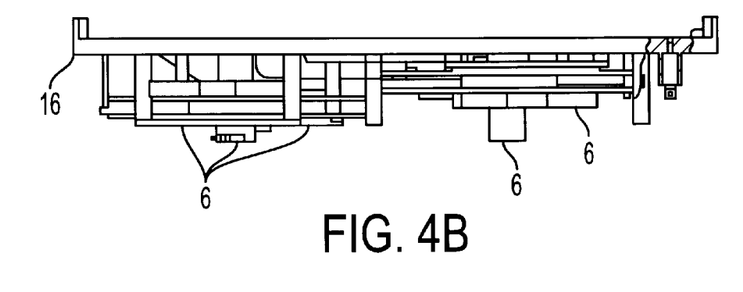
FIG. 4B is a side view perspective of the false bottom from FIG. 4A.
Figure 5A:
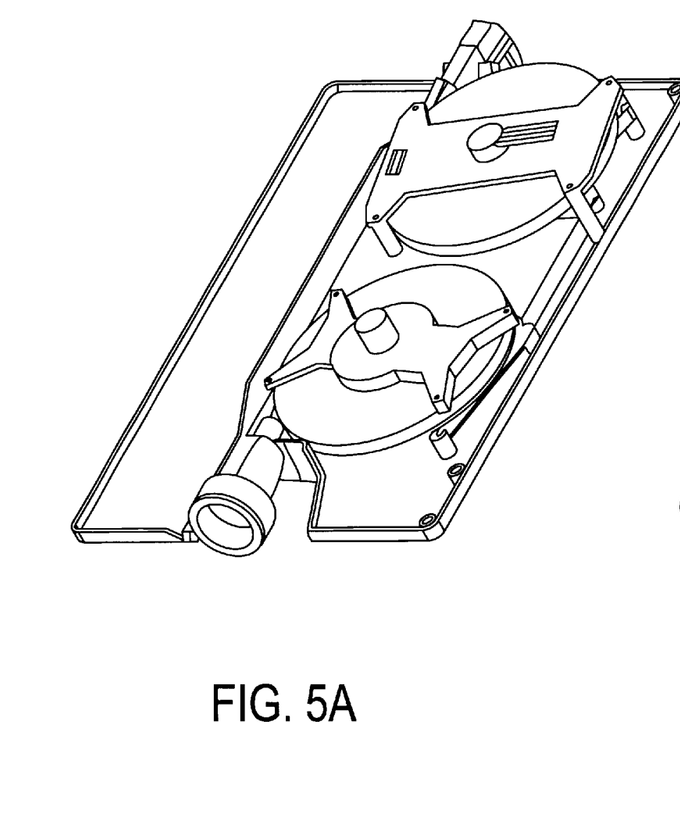
FIG. 5A is a bottom view isometric perspective of the false bottom from FIGS. 4A and 4B.
Figure 5B:
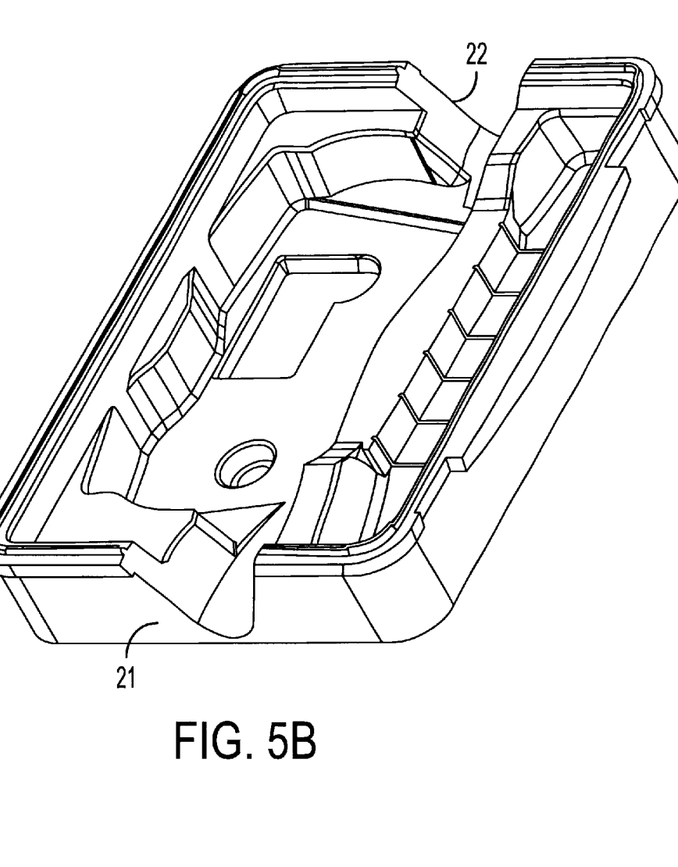
FIG. 5B is an embodiment of the mounting portion of the present perspective.

FIG. 4A is a bottom view perspective of another embodiment of the false bottom. Cable reels 4 and wind-up arrangements 6 are attached to attached to false bottom 16. Spring mechanisms 20 are utilized to retract electrical cable 3 back onto the cable reels. FIG. 4B is a side view perspective of the false bottom from FIG. 4A;

FIG. 5A is a bottom view isometric perspective of the false bottom from FIGS. 4A and 4B; and FIG. 5B is an embodiment of the mounting portion of the present perspective. Slots 21 and 22, which are used as the first and second pass-through openings are provided which allows the electrical cable 3 to be simultaneously removed or installed with the false bottom 16.

Figure 6:
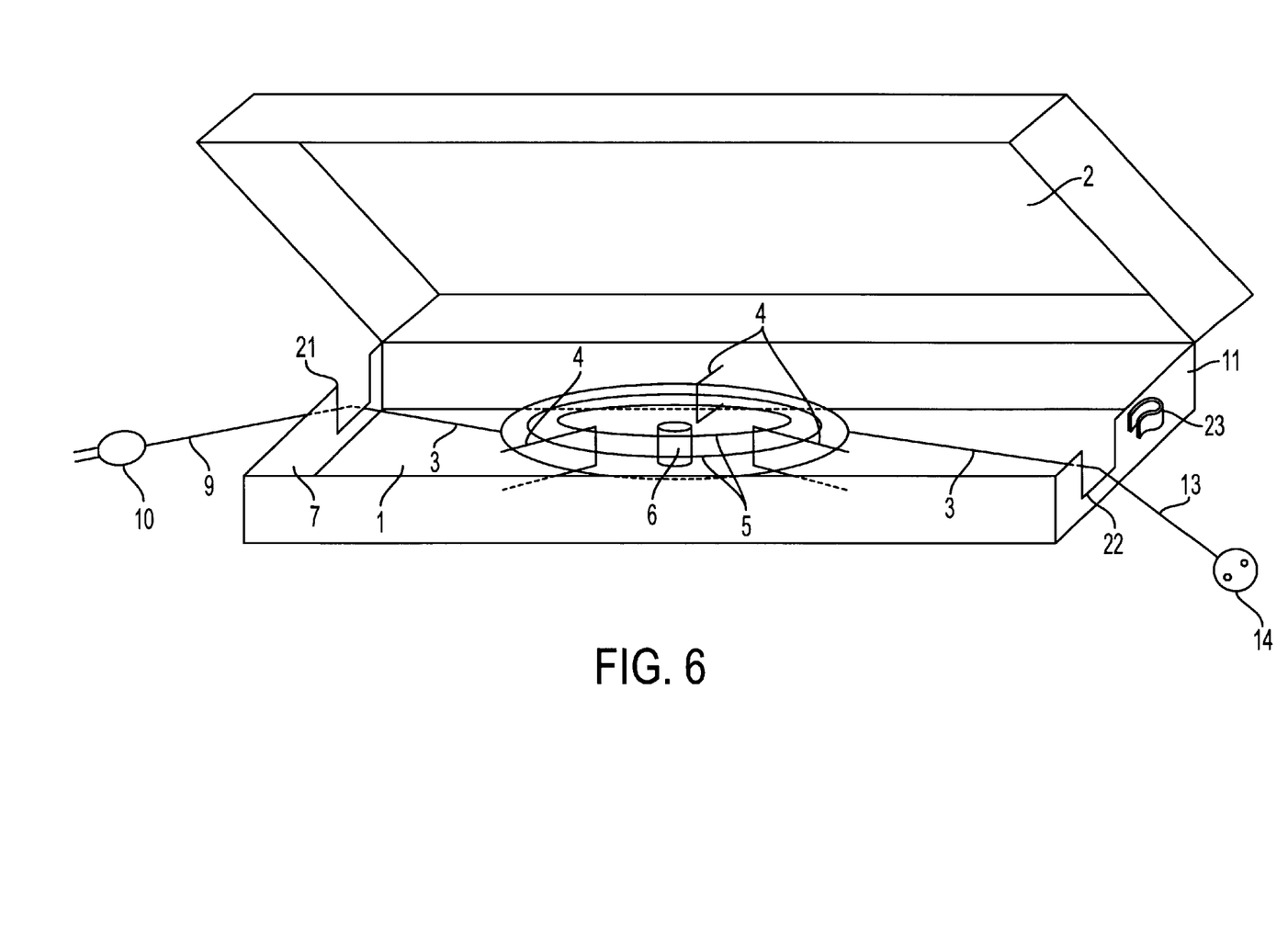
FIG. 6 is an embodiment which features slots and an exterior attachment device.

FIG. 6 depicts an embodiment which utilizes slots 21, 22 as the first and second pass-through openings. Also illustrated in FIG. 4, is another embodiment of the attachment device 13 for the cable connection ends 10, 14 provided on the exterior of the toolbox.

What is claimed is:

1. A toolbox comprising:
   a mounting portion comprising a bottom side and a first plurality of side walls connected to said bottom side, said mounting portion defining a first compartment;
   a cover portion comprising a top side and a second plurality of side walls connected to said top side, said cover portion defining a second compartment;
   a removable false bottom having a mounting portion side and a cover portion side positionable between said mounting portion and said cover portion;
   a first cable reel and second cable reel being mounted to said mounting portion side of said false bottom about a first and second axis, said first and second cable reels rotatable about the first and second axis, respectively;
   an electrical cable comprising a first cable section having a first connection end having an electrical plug, said first cable section being wound on said first cable reel, and a second cable section having a second connection end with an electrical coupling, said second cable section being wound on said second cable reel, said first and second cable sections being electrically coupled together;
   a first cable wind-up arrangement associated with said first cable reel and a second cable wind-up arrangement associated with said second cable reel;
   a first cable pass-through opening and a second cable pass-through opening in at least one of said first plurality of side walls of said mounting portion;
   wherein said mounting portion and said cover portion are fit together to form said toolbox, said toolbox enclosing said false bottom, and
   wherein said first and second cable reels, said electrical cable, and said first and second cable wind-up arrangements are enclosed within the first compartment.

2. The toolbox according to claim 1, said first and second cable wind-up arrangements further comprising a first and second spring mechanism biased against said first and second cable reels so that said first and second cable reels automatically wind-up when said first and second cables are unwound, respectively.

3. The toolbox according to claim 1, said first and second cable wind-up arrangements further comprising a first and second locking mechanism associated with said first and second wind-up arrangements respectively, wherein when said first and second cable sections are unwound to a desired length, said first and second locking mechanisms temporarily lock said first and second cable sections in the desired length.

4. The toolbox according to claim 1, said first cable reel and second cable reel releasably mounted to said mounting portion side of said false bottom by one of wing nuts, wing bolts and snap locks.

5. The toolbox according to claim 4, said second compartment defining a space utilized for storing tools.

6. The toolbox according to claim 1, said false bottom configured as a partition between said first and second compartments isolating said first and second cable reels, said electrical cable, and said first and second cable wind-up arrangements from said second compartment.

7. The toolbox according to claim 1, said first cable pass-through opening and said second cable pass-through opening formed as slots extending to an outside edge of said first plurality of side walls of said mounting portion, wherein said false bottom, said first and second cable reels, said electrical cable, and said first and second cable wind-up arrangements are positioned within the first compartment and removed from the first compartment in a substantially normal direction to the planar orientation of said bottom side of said mounting portion as an entire unit.

8. The toolbox according to claim 1, said first and second pass-through openings formed as one of indentations and recesses projecting inside the first compartment for which said electrical plug and said electrical coupling are stored when said electrical cable is completely wound up.

9. The toolbox according to claim 1, further comprising at least one attachment device coupled to an exterior portion of said toolbox, wherein said at least one attachment device is adapted to releasably hold at least one of said first and second connection ends.

10. The toolbox according to claim 1, wherein said mounting portion and said cover portion are coupled together by a hinge to form said toolbox.

11. The toolbox according to claim 1, further comprising locking hardware for securing said mounting portion and cover portion together.

12. A toolbox comprising:
   a mounting portion comprising a bottom side and a first plurality of side walls connected to said bottom side, said mounting portion defining a first compartment;
   a cover portion comprising a top side and a second plurality of side walls connected to said top side, said cover portion defining a second compartment;
   a first cable reel and second cable reel mounted within the first compartment to said bottom side, said first and second cable reels rotatable about a first and second axis, respectively;
   an electrical cable comprising a first cable section having a first connection end with an electrical plug, said first cable section being wound on said first cable reel, and a second cable section having a second connection end with an electrical coupling, said second cable section being wound on said second cable reel, and said first and second cable sections being electrically coupled together;
   a first cable wind-up arrangement associated with said first cable reel and a second cable wind-up arrangement associated with said second cable reel;
   a first cable pass-through opening and a second cable pass-through opening in at least one of said first plurality of side walls of said mounting portion;
   wherein said mounting portion and said cover portion fit together to form said toolbox, and
   wherein said first and second cable reels, said electrical cable, and said first and second cable wind-up arrangements are enclosed with the first compartment.

13. The toolbox according to claim 12, further comprising a removable false bottom having a mounting portion side and a cover portion side, said removable false bottom positionable between said mounting portion and said cover portion.

14. The toolbox according to claim 13, said second compartment defining a space utilized for storing tools.

15. The toolbox according to claim 12, said false bottom configured a partition between said first and second compartments isolating said first and second cable reels, said electrical cable, and said first and second cable wind-up arrangements from said second compartment.

16. The toolbox according to claim 15, said first cable reel and second cable reel releasably mounted to said bottom side of said mounting portion by one of wing nuts, wing bolts and snap locks.

17. The toolbox according to claim 12, said first and second cable wind-up arrangements further comprising a first and second spring mechanism biased against said first and second cable reels so that said first and second cable reels automatically wind-up when said first and second cables are unwound, respectively.

18. The toolbox according to claim 12, said first and second cable wind-up arrangements further comprising a first and second locking mechanism associated with said first and second wind-up arrangements respectively, wherein when said first and second cable sections are unwound to a desired length, said first and second locking mechanisms temporarily lock said first and second cable sections in the desired length.

19. The toolbox according to claim 12, said first cable pass-through opening and said second cable pass-through opening formed as slots extending to an outside edge of said first plurality of side walls of said mounting portion, said first and second cable reels, said electrical cable, and said first and second cable wind-up arrangements may be positioned within the first compartment or removed from the first compartment in a substantially normal direction to the planar orientation of said bottom side of said mounting portion as an entire unit.

20. The toolbox according to claim 12, said first and second pass-through openings formed as one of indentations and recesses projecting inside the first compartment for which said electrical plug and said electrical coupling are stored when said electrical cable is completely wound up.

21. The toolbox according to claim 12, further comprising at least one attachment device coupled to an exterior portion of said toolbox, wherein said at least one attachment device is adapted to releasably hold at least one of said first and second connection ends.

22. The toolbox according to claim 12, wherein said mounting portion and said cover portion are coupled together by a hinge to form said toolbox.

23. The toolbox according to claim 12, further comprising locking hardware for securing said mounting portion and cover portion together.

* * * * *